US009131388B2

(12) United States Patent
Huang et al.

(10) Patent No.: US 9,131,388 B2
(45) Date of Patent: Sep. 8, 2015

(54) WIRELESS COMMUNICATIONS METHOD AND APPARATUS

(71) Applicants: Gillian Huang, Cambridge (GB); Yue Wang, Cambridge (GB); Justin Coon, Bristol (GB)

(72) Inventors: Gillian Huang, Cambridge (GB); Yue Wang, Cambridge (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 13/712,310

(22) Filed: Dec. 12, 2012

(65) Prior Publication Data
US 2013/0176875 A1 Jul. 11, 2013

(30) Foreign Application Priority Data

Dec. 12, 2011 (GB) .................................. 1121378.2

(51) Int. Cl.
| | |
|---|---|
| H04L 12/26 | (2006.01) |
| H04L 1/00 | (2006.01) |
| H04J 3/14 | (2006.01) |
| H04W 24/00 | (2009.01) |
| H04B 7/155 | (2006.01) |
| H04L 27/26 | (2006.01) |

(52) U.S. Cl.
CPC ........... *H04W 24/00* (2013.01); *H04B 7/15535* (2013.01); *H04L 27/2614* (2013.01)

(58) Field of Classification Search
None
See application file for complete search history.

(56) References Cited

U.S. PATENT DOCUMENTS

| 8,185,043 B2 * | 5/2012 | Nishio et al. ...................... 455/7 |
| 2007/0190934 A1 * | 8/2007 | Kim et al. .......................... 455/7 |
| 2009/0257386 A1 * | 10/2009 | Achir et al. ..................... 370/329 |
| 2010/0035541 A1 * | 2/2010 | Kim et al. .......................... 455/9 |
| 2011/0273999 A1 | 11/2011 | Nagaraja |

(Continued)

FOREIGN PATENT DOCUMENTS

| JP | 2001-156692 A | 6/2001 |
| JP | 2009-188551 A | 8/2009 |

(Continued)

OTHER PUBLICATIONS

Vien et al. "Performance Analysis of Fixed-Gain Amplify-and-Forward Relaying with MRC", IEEE Transactions on Vehicular Technology, vol. 59, No. 3, Mar. 2010.*

(Continued)

*Primary Examiner* — Curtis A Alia
*Assistant Examiner* — Rebecca Song
(74) *Attorney, Agent, or Firm* — Oblon, McClelland, Maier & Neustadt, L.L.P.

(57) ABSTRACT

A method of relaying a signal in a wireless communications network including a plurality of wireless devices is performed by at least one of said wireless devices to relay a signal in a communication path between one of said plurality of wireless devices and another one of said wireless devices, wherein said at least one of said wireless devices includes a power amplifier for amplifying said signal, the method including receiving a signal from said one of said plurality of wireless devices, determining a peak-to-average power ratio of said received signal under a plurality of predetermined relay modes, determining a back-off value associated with said power amplifier, selecting a mode of relaying said signal from said plurality of predetermined relay modes based on said determined peak-to-average power ratio and said determined back-off value, and transmitting said signal to said another one of said plurality of wireless devices using said selected mode.

7 Claims, 10 Drawing Sheets

(56) References Cited

U.S. PATENT DOCUMENTS

| | | |
|---|---|---|
| 2012/0106437 A1* | 5/2012 | Seo et al. .................. 370/315 |
| 2012/0213101 A1* | 8/2012 | Shimizu .................... 370/252 |
| 2012/0218934 A1* | 8/2012 | Takehana et al. .......... 370/315 |

FOREIGN PATENT DOCUMENTS

| | | |
|---|---|---|
| JP | 2010-98508 A | 4/2010 |
| JP | WO 2010/134188 A1 | 11/2010 |

OTHER PUBLICATIONS

Office Action issued Dec. 3, 2013 in Japanese Patent Application No. 2012-270953 with English language translation.

United Kingdom combined Search and Examination Report issued on Mar. 28, 2012 in corresponding Great Britain Application No. 1121378.2 filed on Dec. 12, 2011.

Office Action issued Dec. 3, 2013 in Japanese Patent Application No. 2012-270953 with English language translation, citing documents AO-AR therein.

\* cited by examiner

WIRELESS COMMUNICATIONS METHOD AND APPARATUS

FIELD

Embodiments describe herein relate generally to wireless communications via a relay station in a wireless communications network.

BACKGROUND

Recently, wireless relay networks have become an area of popular research. This is due to their ability to extend communication coverage, increase channel capacity, and improve link reliability. There are two types of relaying strategies: (1) decode-and-forward (DF) relay, whereby a received signal is decoded, re-encoded, and forwarded by a relay device, and (2) amplify-and-forward (AF) relay, whereby a received signal is simply amplified and forwarded to another wireless device or another relay device in the network. The DF scheme is generally used in dedicated relay devices (e.g. relay stations operating in 3GPP LTE-Advanced and IEEE 802.16j systems) which can afford the complexity involved under the DF scheme. However, the AF scheme is generally preferred for battery operated devices as such devices usually have their own data to transmit and the complexity of relaying operation needs to be kept to a minimum (e.g. nodes in smart grid and sensor networks). A disadvantage of the AF scheme is that noise is propagated into or amplified in relayed signals.

The AF relay scheme can be further categorised into fixed gain amplification and variable gain amplification (herein referred to as FAF and VAF respectively). Assuming that the average transmit power at each of the AF relay nodes is 1, the amplification gain for a FAF relay node can be determined by the following formula:

$$\alpha_i = \sqrt{\frac{1}{E[|h_i|^2] + \sigma_i^2}} \quad (1)$$

where $\sigma_i^2 = E[|n_i|^2]$ denotes the noise variance at the i-th relay node.

For a VAF relay node, the amplification gain can be determined by:

$$\alpha_i = \sqrt{\frac{1}{|h_i|^2 + \sigma_i^2}} \quad (2)$$

where the instantaneous channel power, $|h_i|^2$, at the i-th relay node is used to determine the variable gain.

DESCRIPTION OF THE DRAWINGS

Embodiments will now be described with reference to the accompanying drawings, in which.

DETAILED DESCRIPTION

Figure 1:
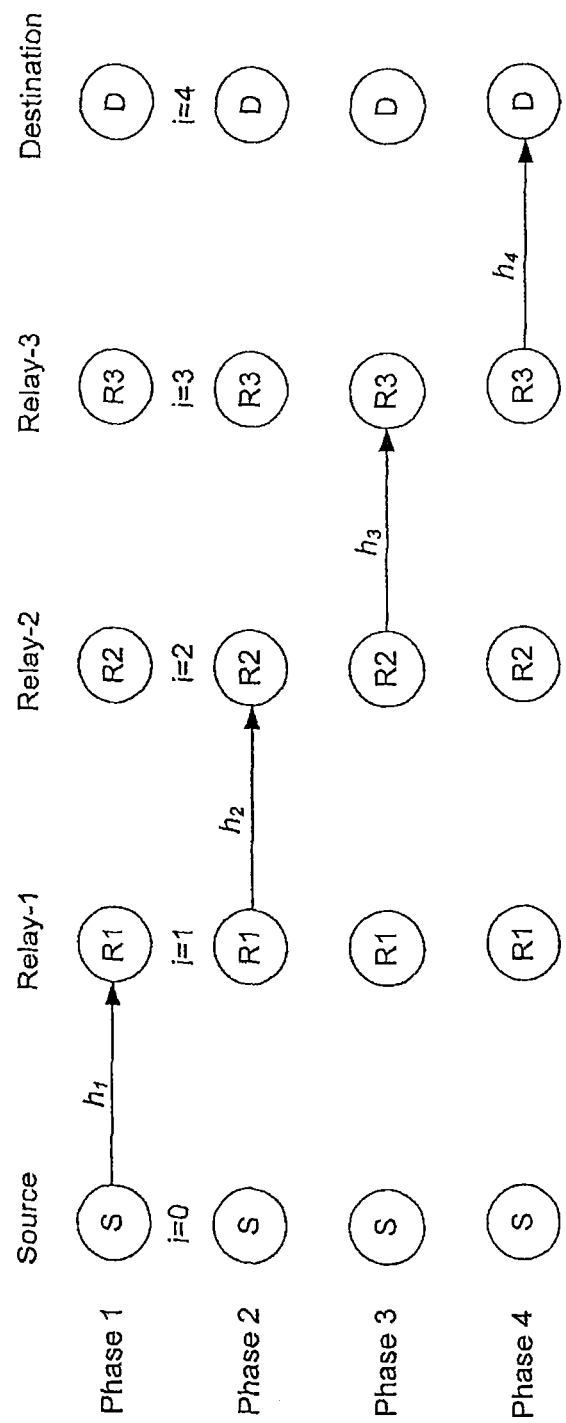
FIG. 1 illustrates a multi-hop relay network with a single relay path according to an embodiment.

Specific embodiments will be described in further detail in the following paragraphs on the basis of the attached figures. It will be appreciated that this is by way of example only, and should not be viewed as presenting any limitation on the scope of protection sought.

In an embodiment there is provided a method of relaying a signal in a wireless communications network comprising a plurality of wireless devices, the method being performed by at least one of said wireless devices to relay a signal in a communication path between one of said plurality of wireless devices and another one of said wireless devices, wherein said at least one of said wireless devices comprises a power amplifier for amplifying said signal, the method comprising receiving a signal from said one of said plurality of wireless devices, determining a peak-to-average power ratio of a reference signal under a plurality of predetermined relay modes, determining a back-off value associated with said power amplifier, selecting a mode of relaying said signal from said plurality of predetermined relay modes based on said determined peak-to-average power ratio and said determined back-off value, and transmitting said signal to said another one of said plurality of wireless devices using said selected mode.

The step of selecting mode of relaying said signal may be performed such that the peak-to-average power ratio of the received signal is less than or equal to the back-off value.

Said plurality of predetermined relay modes may include a decode-and-forward mode, a fixed gain amplify-and-forward mode, and a variable gain amplify-and-forward mode.

According to another embodiment there is provided a method of relaying a signal in a wireless communications network comprising a plurality of wireless devices, the method being performed by at least one of said wireless devices to relay a signal in a communication path between one of said plurality of wireless devices and another one of said wireless devices, the method comprising receiving a signal from said one of said plurality of wireless devices, determining a signal type of said received signal, selecting a mode of relaying said signal from a plurality of predetermined relay modes based on said determined signal type, and transmitting said signal to said another one of said plurality of wireless devices using said selected mode.

Said plurality of predetermined relay modes may include a decode-and-forward mode, a fixed gain amplify-and-forward mode, and a variable gain amplify-and-forward mode.

The signal type may include a data signal, a channel sounding signal, and a control channel signal.

The step of selecting said mode of relaying said signal may include determining the number of communication path between said one of said plurality of wireless devices and said another one of said wireless devices.

In one embodiment, there is provided a step of de-multiplexing said received signal into a plurality of signal streams.

In another embodiment, the method may further comprise selecting a mode of relaying said signal from said plurality of predetermined relay modes for relaying each of said plurality of signal streams.

In yet another embodiment, the method may further comprise multiplexing said plurality of signal streams into a signal for transmission to said another one of said plurality of wireless devices.

According to another embodiment there is provided a relay device for relaying a signal in a wireless communications network comprising a plurality of wireless devices, the relay device being configured to relay said signal in a communication path between one of said plurality of wireless devices and another one of said plurality of wireless devices, the relay device comprising a receiver for receiving a signal from one of said plurality of wireless devices, a power amplifier for amplifying said received signal, a processor configured to determine a peak-to-average power ratio of a reference signal under a plurality of predetermined relay modes, and to determine a back-off value associated with said power amplifier, a selector for selecting a mode of relaying said signal from said plurality of predetermined relay modes based on said determined peak-to-average power ratio and said determined back-off value, and a transmitter for transmitting said signal to said another one of said plurality of wireless devices using said selected mode.

The selector may be configured to select a mode of relaying said signal such that the peak-to-average power ratio of the received signal is less than or equal to the back-off value.

Said plurality of predetermined relay modes may include a decode-and-forward mode, a fixed gain amplify-and-forward mode, and a variable gain amplify-and-forward mode.

In another embodiment there is provided a relay device for relaying a signal in a wireless communications network comprising a plurality of wireless devices, the relay device being configured to relay said signal in a communication path between one of said plurality of wireless devices and another one of said plurality of wireless devices, the relay device comprising a receiver for receiving a signal from said one of said plurality of wireless devices, a processor configured to determine a signal type of said received signal, a selector for selecting a mode of relaying said signal from a plurality of predetermined relay modes based on said determined signal type, and a transmitter for transmitting said signal to said another one of said plurality of wireless devices using said selected mode.

Said plurality of predetermined relay modes may include a decode-and-forward mode, a fixed gain amplify-and-forward mode, and a variable gain amplify-and-forward mode.

Said signal type may include a data signal, a channel sounding signal, and a control channel signal.

In one embodiment, the relay device may further comprise means for determining the number of communication path between said one of said plurality of wireless devices and said another one of said wireless devices.

In another embodiment, the relay device may further comprise a de-multiplexer for de-multiplexing said received signal into a plurality of signal streams.

Said selector is further configured to select a mode of relaying said signal from said plurality of predetermined relay modes for relaying each of said plurality of signal streams.

The relay device may further comprise a multiplexer for multiplexing said plurality of signal streams into a signal for transmission to said another one of said plurality of wireless devices.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

A simplified illustration of a multi-hop relay network with a single relay path is shown in FIG. 1. In this example, the number of hops, M, is 4, and the number of relay nodes, M−1, is 3. In FIG. 1, each illustrated circle in each row represents a node in the network. Each row represents different phases of relaying a signal from the source node, S, through the relay nodes, R1, R2, and R3, to the destination node, D. Although it is illustrated in this example that direct communications are established between adjacent nodes, the skilled person would appreciate that direct communications can also be established between non-adjacent nodes.

As illustrated in FIG. 1, a signal is generated and transmitted from the source node, S, to the first relay node, R1, in phase 1. Once the signal is received by R1, the signal is amplified and forwarded to the next adjacent node, R2, in phase 2. The same process continues until the signal is received by the destination node, D, in phase 4.

In a block-based signal transmission, the received symbols at the relay node, R1, can be represented by the following equation:

$$y_1(k)=h_1x(k)+n_1(k) \quad (3)$$

where x(k) denotes the k-th transmit symbol from the source, k=0, . . . , K−1 and K is the number of transmit symbols per block, $h_1$ denotes the channel response at the first hop and $n_1(k)$ denotes the k-th received noise at R1 with a variance of $\sigma_1^2=E[|n_1(k)|^2]$. To simplify the description, the transmit symbol power is assumed to be unity, i.e. $E[|x(k)|^2]=1$.

In a DF relay system, the received signal $y_1(k)$ is demodulated, re-encoded and forwarded to the next relay node. This significantly increases the complexity of the relay node. In contrast, an AF relay node has a lower complexity, where the received signal $y_1(k)$ is simply amplified by a gain, $a_1$, and forwarded to the next relay node. Hence, the transmit signal at an AF R1 node can simply be represented by $a_1y_1(k)$.

In a generalised multi-hop AF relay system with a single relay path, the received signal at the destination or the M-th node (for M≥2) is given by $$y_M(k) = h_1 \underbrace{\left(\prod_{i=1}^{M-1} \alpha_i h_{i+1}\right)}_{h} x(k) + \underbrace{\sum_{i=1}^{M-1} \left(\prod_{j=i}^{M-1} \alpha_j h_{j+1}\right) n_i(k) + n_M(k)}_{n} \quad (4)$$

where $h_i$ denotes the channel response at the i-th hop, $n_i(k)$ denotes the k-th received noise at the i-th node and $a_i$ denotes amplification gain at the i-th relay node. In addition, h and n in equation 4 denote the AF compound channel response and the AF compound noise respectively. If a pilot signal is transmitted by the source node, S, the relay node can perform coherent data detection based on knowledge of the AF compound channel response and the compound noise variance.

Figure 2:
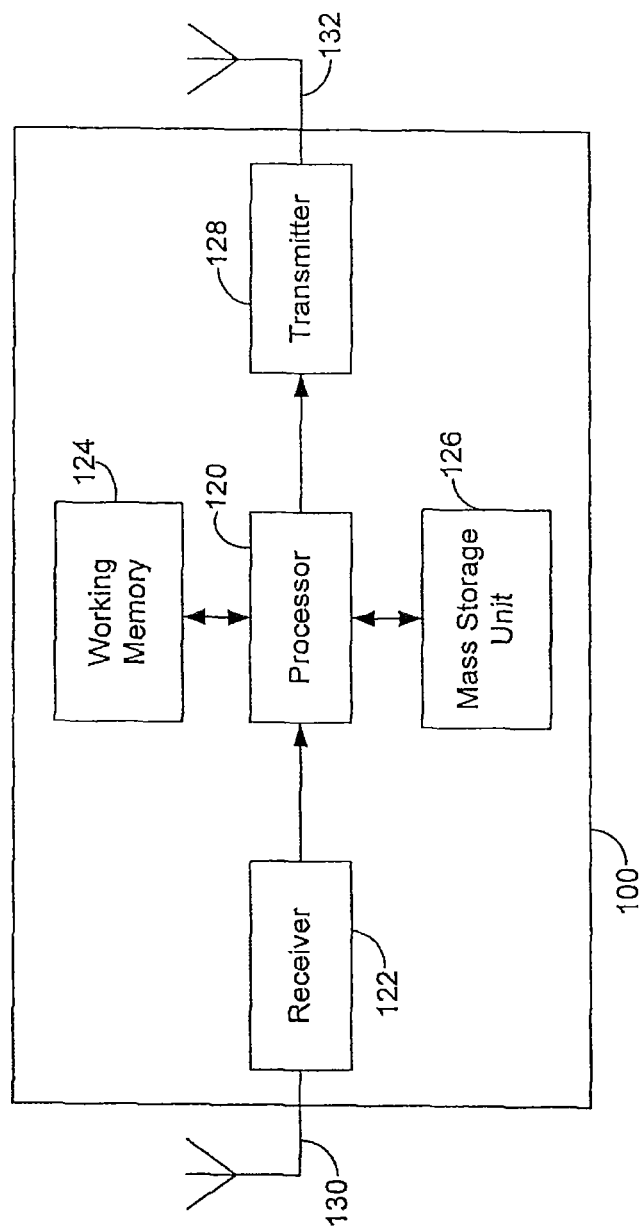
FIG. 2 illustrates an exemplary relay device incorporating an embodiment.

FIG. 2 illustrates schematically hardware operably configured (by means of software or application specific hardware components) as a relay device 100.

The relay device 100 illustrated in FIG. 2 is generally capable of being used to establish a communications channel with one or more other devices and, in accordance with a specific embodiment. The reader will appreciate that the actual implementation of the relay device is non-specific, in that it could be any communication device such as a base station, an access point, or a user terminal.

The relay device 100 comprises a receiver 122, the output from which is coupled to a processor 120. The input to the receiver 122 is connected to receive signals from an antenna 130. In this illustrated embodiment, one receive antenna is provided, though practical implementations may include more antennas depending on the application.

The processor 120 is operable to execute machine code instructions stored in a working memory 124 and/or retrievable from a mass storage unit 126. In the illustrated embodiment in FIG. 2, the working memory 124 stores user applications which, when executed by the processor 120, cause relay signal operations to be performed according to embodiments of the present invention.

Communications facilities in accordance with the specific embodiment are also stored in the working memory, for establishing a communications protocol to enable data generated in the execution of the one of the applications to be processed and then passed to a transmitter 128 for transmission and communication with another communication device, such as a relay device having a similar structure as the illustrated relay device 100. It will be understood that the software defining the applications and the communications facilities may be partly stored in the working memory 124 and the mass storage unit 126, for convenience. A memory manager could optionally be provided to enable this to be managed effectively, to take account of the possible different speeds of access to data stored in the working memory 124 and the mass storage unit 126.

The output of the processor 120 is coupled to the transmitter 128, and the output of the transmitter is in turn connected to an antenna 132 to transmit the relay signal to another communication device. Alternatively, the relay signal could be transmitted via multiple antennas. Furthermore, it will be understood that the transmitter and receiver may be combined to form a transceiver.

It will be appreciated that the source node and the destination node can also function as relay nodes. Therefore, the structure of the relay device 100 described herein applies not only to the relay nodes, but also to the source node and the destination node.

In an embodiment, a hybrid DF and AF relay configuration at a relay device is considered in order to optimise the performance-complexity trade-off between the two types of relay schemes.

In this embodiment, the relay device 100 is configured to operate between the DF scheme and the AF scheme based on a number of criteria, which will be described in full in due course.

Figure 3:
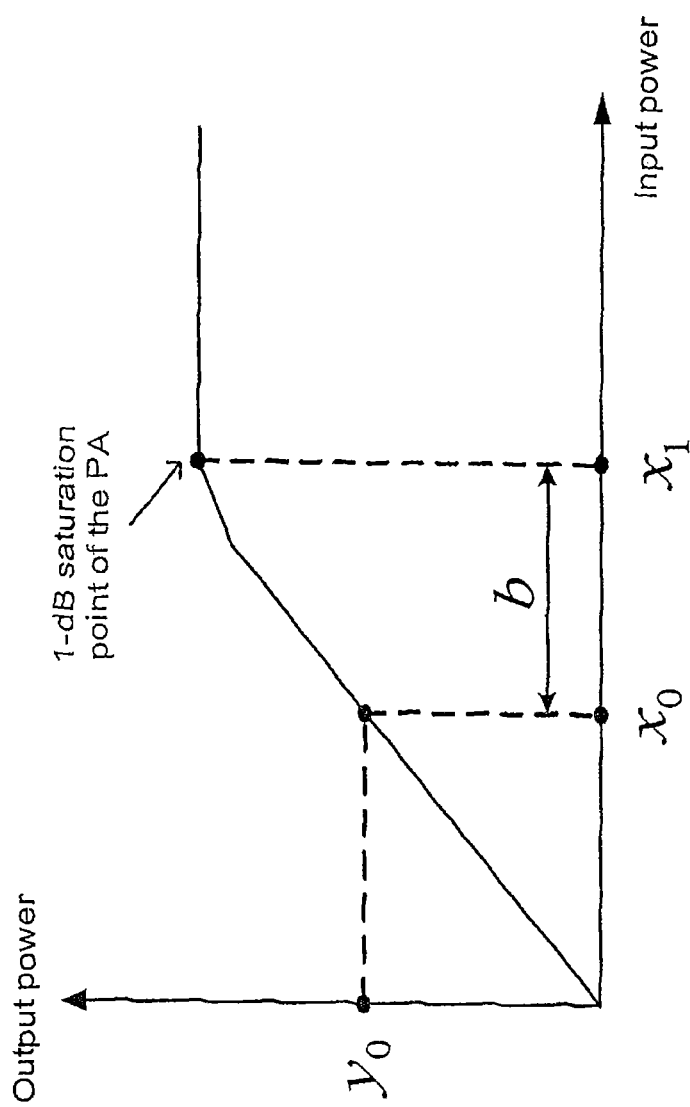
FIG. 3 illustrates a gain characteristic of a power amplifier.

FIG. 3 illustrates a gain characteristic of a power amplifier. In this illustrated example, $x_1$ denotes the 1-dB saturation point of the power amplifier and $x_0$ denotes the average output of a signal (such as a relay signal) at the input of the power amplifier. The average output of the power amplifier can be expressed as:

$$y_0 = G \cdot x_0 \quad (5)$$

where G is the linear gain of the power amplifier.

As illustrated in FIG. 3, the "back-off" defines the region where the power amplifier can be operated without being driven into the non-linear region, and is expressed as:

$$b = x_1 - x_0 (\text{dB}) \quad (6)$$

It is noted that transmission of a signal with a high peak-to-average power ratio (PAPR) requires a highly linear power amplifier with a large back-off to avoid adjacent channel interference caused by nonlinear effects. Conversely, the demand on the linearity of the power amplifier can be relaxed when the signal has a low PAPR.

Figure 4:
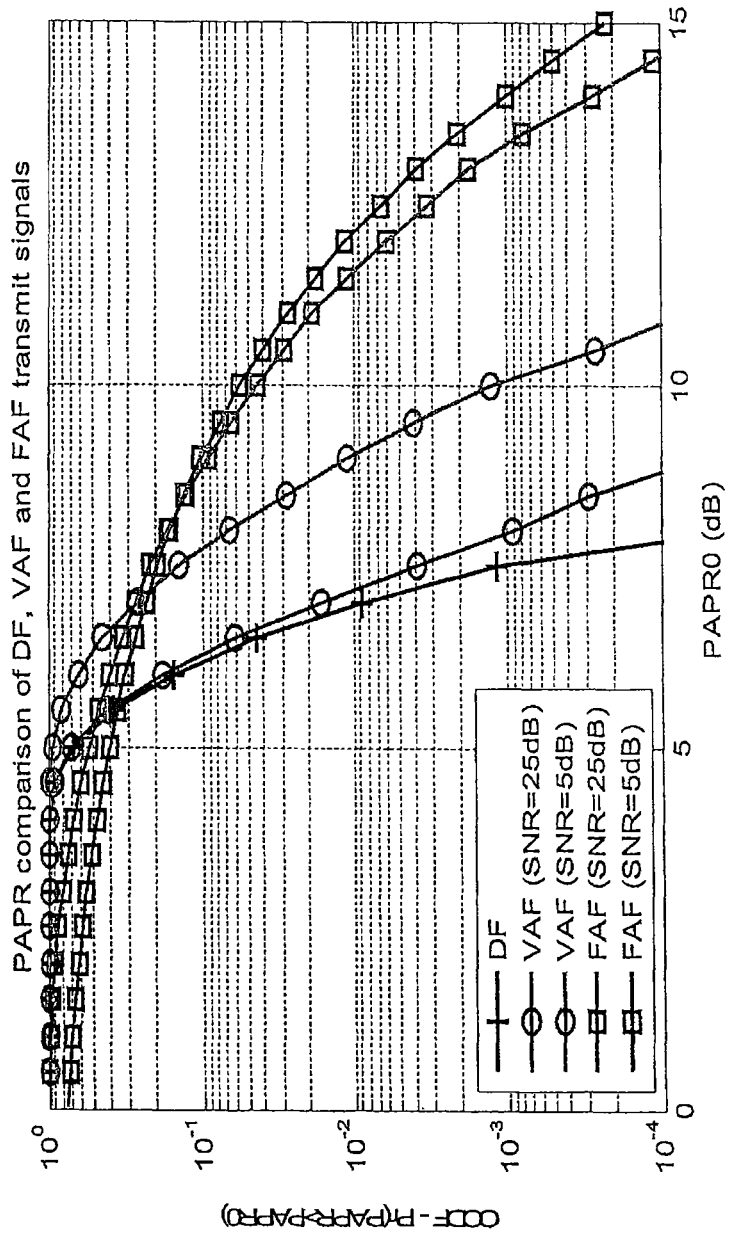
FIG. 4 illustrates the PAPR simulation results of relay signals using DF, VAF, and FAF at a relay device.

FIG. 4 illustrates comparison simulated PAPR values of the relay signals when DF, VAF, and FAF are used at a relay device. A flat Rayleigh fading channel is assumed and quadrature phase shifting keying (QPSK) single carrier (SC) signalling is applied in the simulation. It will be appreciated that the PAPR values of the relay signals will be different under different conditions, but the relative trends remain unchanged.

The simulated PAPRs of the relay signals under the different relay schemes are summarised in Table 1 below.

TABLE 1

| PAPR comparison for different relay schemes | | | | |
|---|---|---|---|---|
| | DF | VAF (SNR = 25 dB) | VAF (SNR = 5 dB) | FAF (SNR = 5 dB) | FAF (SNR = 25 dB) |
| PAPR | 7.5 dB | 8 dB | 10 dB | 13 dB | 14 Db |

Based on the determined "back-off", b, of the power amplifier and the predetermined PAPR, a relay scheme can be selected to ensure that the power amplifier does not operate in the non-linear region. Essentially, the relay scheme is selected such that the PAPR of the relay signal is less than or equal to the back-off, i.e. PAPR≤b.

Accordingly, if the back-off of the power amplifier is 7 dB≤b≤10 dB, the DF relay scheme or the VAF scheme (at high SNR) will be selected. If the back-off region of the power amplifier is 10 dB≤b≤14 dB, the VAF scheme (at low SNR) will be selected. If the b≥14 dB, the FAF scheme will be selected to reduce computational complexity.

Further examples of the selection of relay schemes are provided in Table 2.

TABLE 2

| Back-off, b | Relay Scheme |
|---|---|
| 5 dB ≤ b ≤ 13 dB | DF or VAF (high SNR) |
| 13 dB ≤ b ≤ 18 dB | VAF (low SNR) |
| b ≥ 18 dB | FAF |
| 6 dB ≤ b ≤ 8 dB | DF or VAF (high SNR) |
| 8 dB ≤ b ≤ 12 dB | VAF (low SNR) |
| b ≥ 12 dB | FAF |
| 10 dB ≤ b ≤ 15 dB | DF or VAF (high SNR) |
| 15 dB ≤ b ≤ 20 dB | VAF (low SNR) |
| b ≥ 20 dB | FAF |
| 7 dB ≤ b ≤ 12 dB | DF or VAF (high SNR) |
| 12 dB ≤ b ≤ 25 dB | VAF (low SNR) |
| b ≥ 25 dB | FAF |

Figure 5:
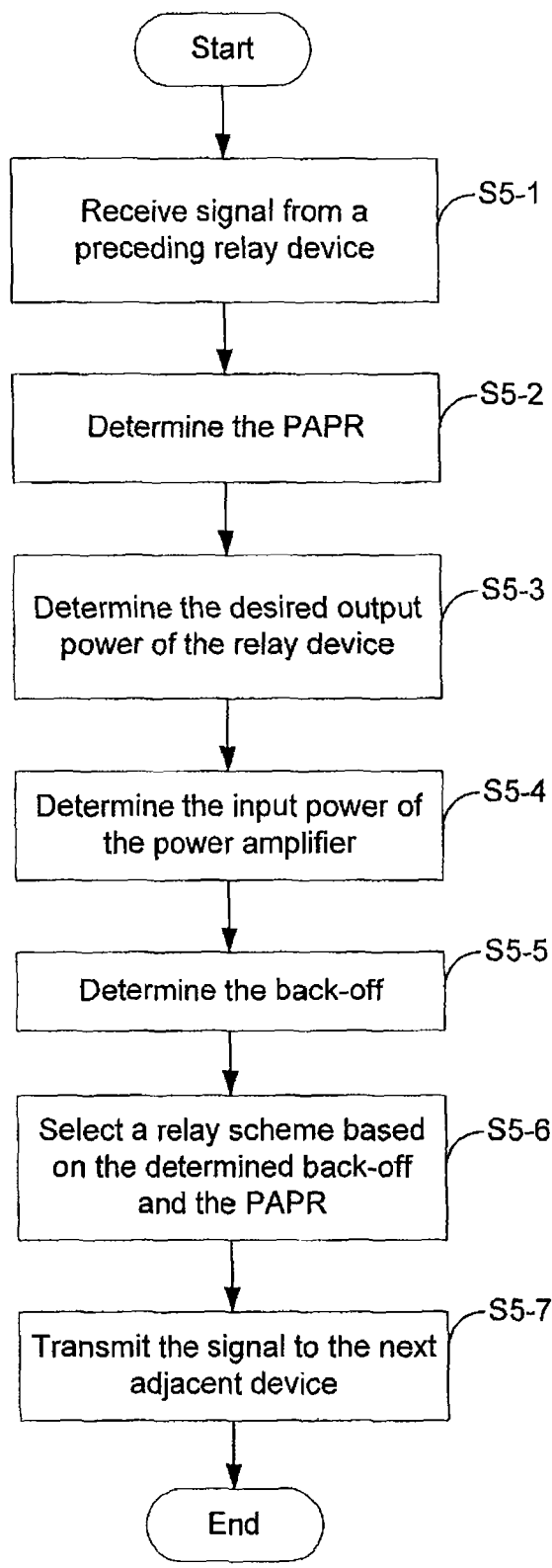
FIG. 5 illustrates the steps of selecting a relay scheme according to an embodiment.

A flow diagram illustrating the steps of selecting a relay scheme according to the present embodiment is shown in FIG. 5.

Referring to the flow chart of FIG. 5, the process begins in step S5-1 when a signal is received by the relay device 100. The PAPR a reference signal to be transmitted by the relay device under different relay schemes is determined in step S5-2. The relay device determines the required output power of the relay device in step S5-3. In step S5-4, the input power of the power amplifier is determined based on the determined required output power, using equation (5). In step S5-5, the back-off of the power amplifier is determined using equation (6). The relay scheme is selected based on the determined back-off and the determined PAPR in step S5-6. Finally, the signal is transmitted to the next adjacent device using the selected relay scheme in step 5-7.

In another embodiment, the relay device 100 is configured to select the relay scheme based on the type of signal being relayed. Examples of the type of signals being relayed in a relay network include data signals, channel sounding signals, and control channel information (such as resource allocation messages).

If the signal is a data signal, the selection of the relay scheme can be performed based on system requirements and transmission schemes. For example, if there is only one relay path in a multi-hop transmission, the DF relay scheme would be preferred. Conversely, if there are multiple relay paths between the source node and the destination node, the AF relay scheme can be used to achieve cooperative diversity.

In general, a source node transmits a channel sounding signal to determine which of the relay paths has the highest compound channel gain. Thus, if the received signal is a channel sounding signal, a relay path having the highest compound channel gain would be preferred. The compound channel can be determined as $$h_i = f_i g_i \quad (7)$$

where $f_i$ denotes the channel response from the source node to i-th relay and $g_i$ denotes the channel response from the i-th relay to the destination node.

In this case, the relay device can operate in the AF scheme to relay the channel sounding signal so as to allow the destination node to determine the best relay path, and to select the best relay path to feed this information back to the source node.

If the received signal comprises control channel information, such as resource allocation message, it is important to ensure that the destination receives this information accurately. Otherwise, subsequent data transmissions could fail. In this case, the DF scheme is used to relay the signal. Moreover, channel sounding signals generally require very low decoding complexity and are generally short. Therefore, this would allow the relay device to operate reliably under the DF scheme.

Figure 6:
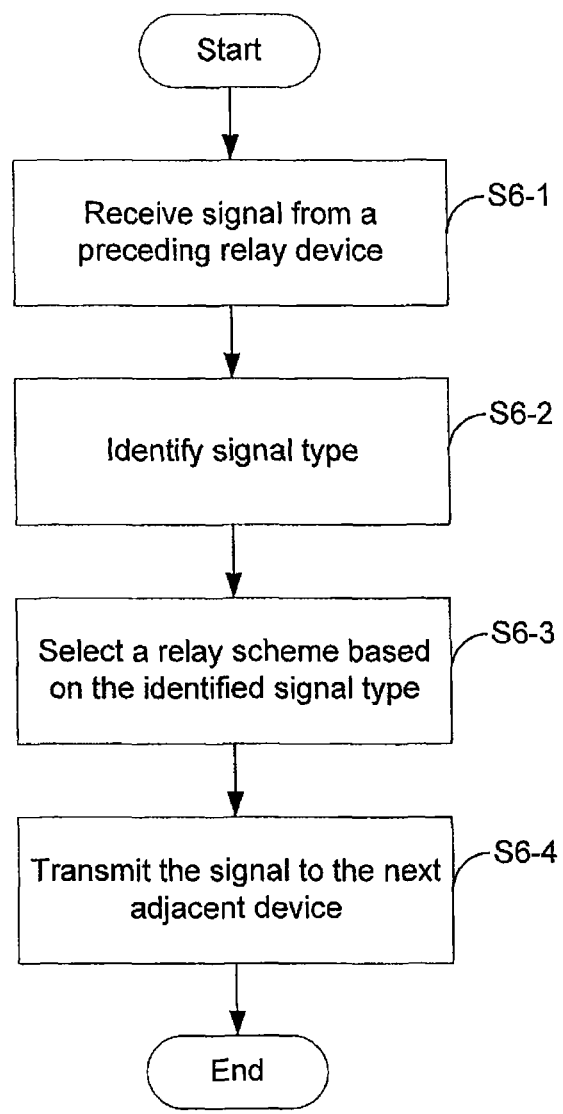
FIG. 6 illustrates the steps of selecting a relay scheme according to another embodiment.

The flowchart of FIG. 6 illustrates that the process commences in step S6-1 when a signal is received by the relay device 100. In step S6-2, the relay device identifies the signal type of the received signal. The relay device then selects the relay scheme based on the identified signal type (step S6-3). Finally, the signal is transmitted to the next adjacent device in step S6-4.

It is noted that when different types of signals are multiplexed within the same transmission packet, a relay device can be configured to transmit a hybrid DF and AF (DF-AF) signal using multiplexing techniques.

Figure 7:
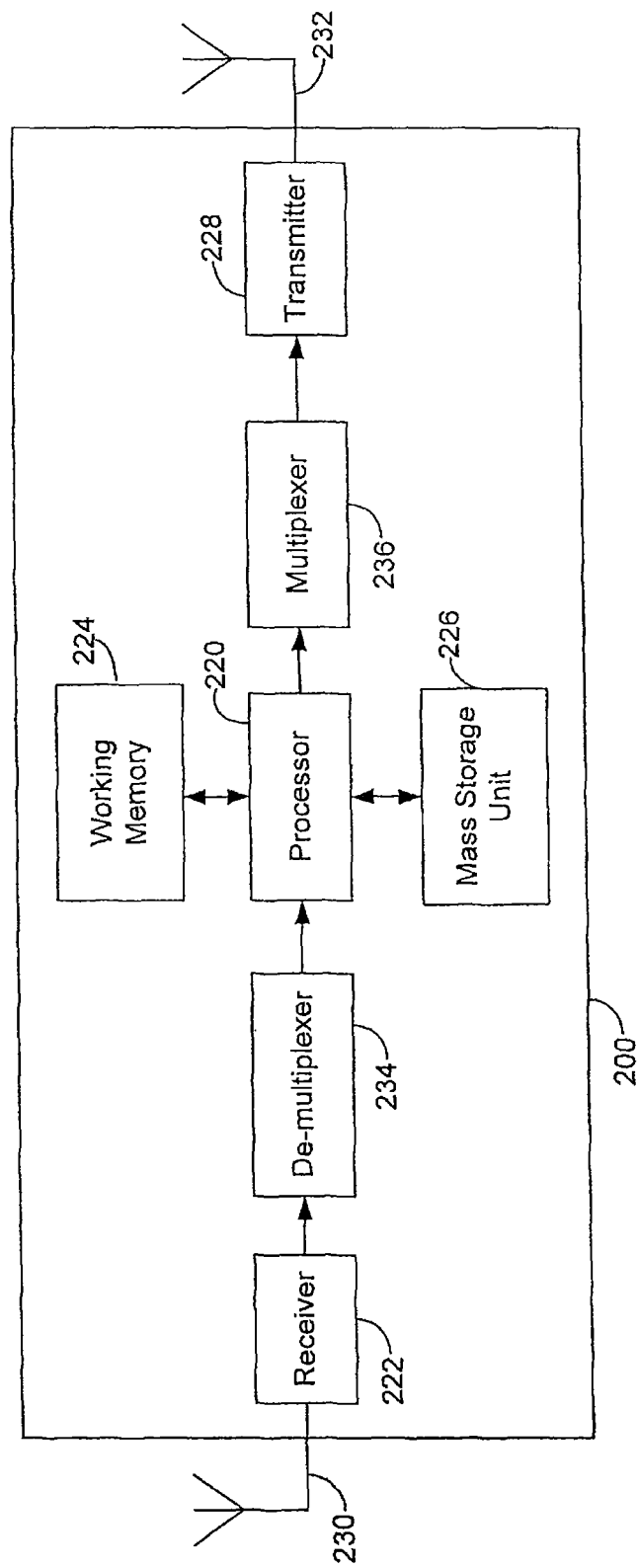
FIG. 7 illustrates an exemplary relay device incorporating another embodiment.

In another embodiment, the hybrid DF-AF configured relay device is adapted to perform multiplexing and de-multiplexing operations. FIG. 7 is a schematic illustrating components of a relay device 200 suitable for use with the present embodiment.

It is noted that the relay device 200 in FIG. 7 differs from the relay device 100 in FIG. 2 in that the relay device 200 includes a de-multiplexer 234 and a multiplexer 236. The remaining components, such as the antennas 230, 232, receiver 222, processor 220, working memory 224, mass storage unit 226, and transmitter 228, perform the same function as those described in the above embodiment. For this reason, details of these components will not be described.

As illustrated in FIG. 7, the de-multiplexer 234 is provided between the receiver 222 and the processor 220, and is configured to de-multiplex the received signal into M signal streams. It is noted that the received signal may include different types of signals from a single node or multiple nodes in the relay network. The processor 220 processes the M signal streams such that each of the signal streams operates either under the DF scheme or the AF scheme. The processed signal streams are multiplexed into a hybrid DF-AF signal using the multiplexer 236 before passing to the transmitter 228 to transmit the hybrid DF-AF signal to the next relay device or the destination.

The multiplexing operations can be performed in the frequency domain, time domain, code domain, and spatial domain (referred to as FDM, TDM, CDM, and SDM respectively). Examples of the multiplexing operations are shown in FIGS. 8 to 11.

Figure 8:
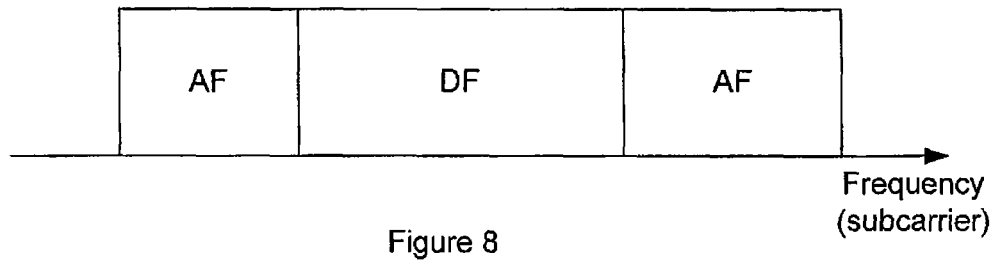
FIG. 8 illustrates a signal-frequency diagram representing the multiplexed DF and AF signals in the frequency domain.

FIG. 8 illustrates a signal-frequency diagram representing the multiplexed DF-AF signals in the frequency domain. In this diagram, the x-axis represents the frequency and the y-axis represents the power of the output response of the multiplexed signals.

Figure 9:
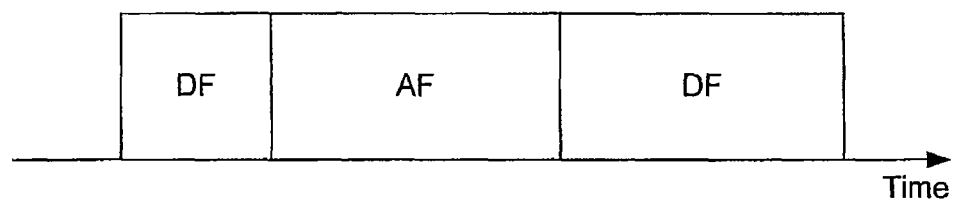
FIG. 9 illustrates a diagram representing the multiplexed DF and AF signals in the time domain.

FIG. 9 illustrates a diagram representing the multiplexed DF-AF signals in the time domain. In this diagram, the x-axis represents the time and the y-axis represents the power of the output response of the multiplexed signals.

Figure 10:
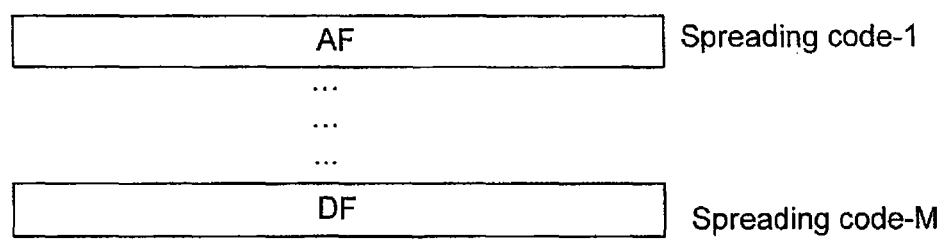
FIG. 10 illustrates the multiplexed DF-AF signals in the code domain.

FIG. 10 shows a representation of the multiplexed DF-AF signals in the code domain. As shown in FIG. 10, the DF and the AF signals are spread over M spreading codes.

Figure 11:
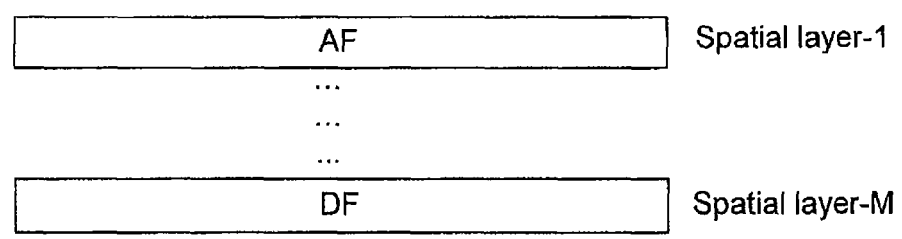
FIG. 11 illustrates the multiplexed DF-AF signals in the spatial domain.

FIG. 11 shows that the DF-AF signals can be multiplexed in the spatial domain. In FIG. 11, the multiplexed signals are spread in the spatial domain over M spatial layers.

Figure 12:
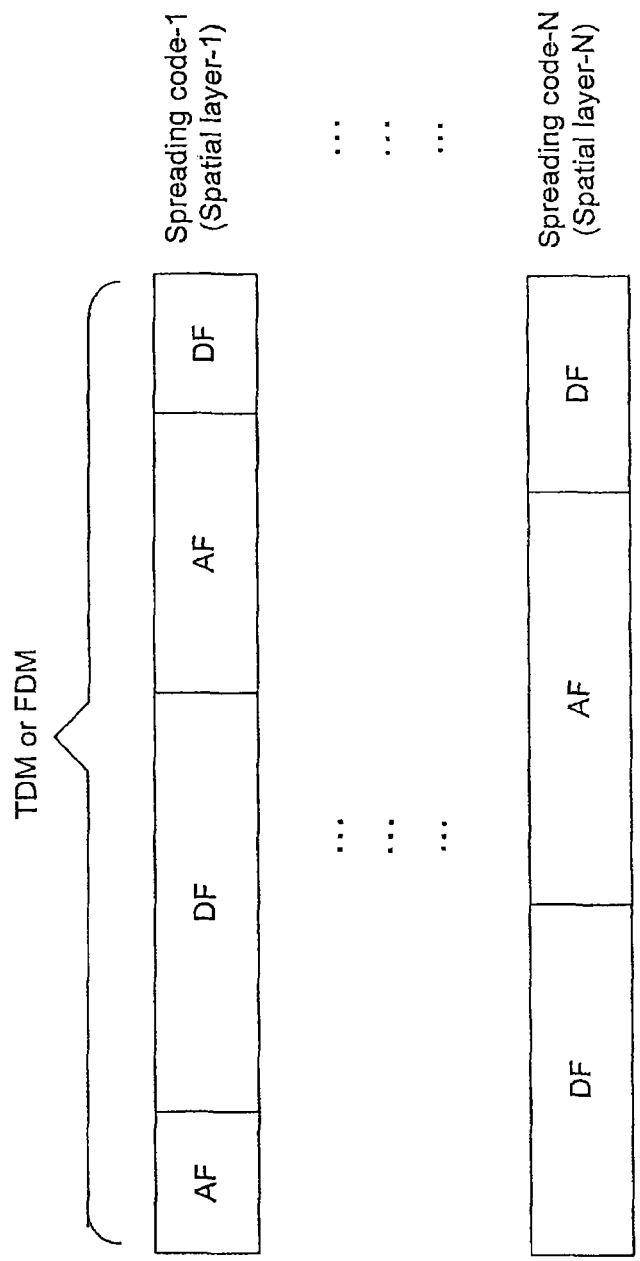
FIG. 12 illustrates the multiplexed DF-AF signals in more than one domain.

It is further noted that the multiplexing operation can be performed in more than one domain. As shown in FIG. 12, the TDM or FDM is performed on top of the CDM or SDM.

Figure 13:
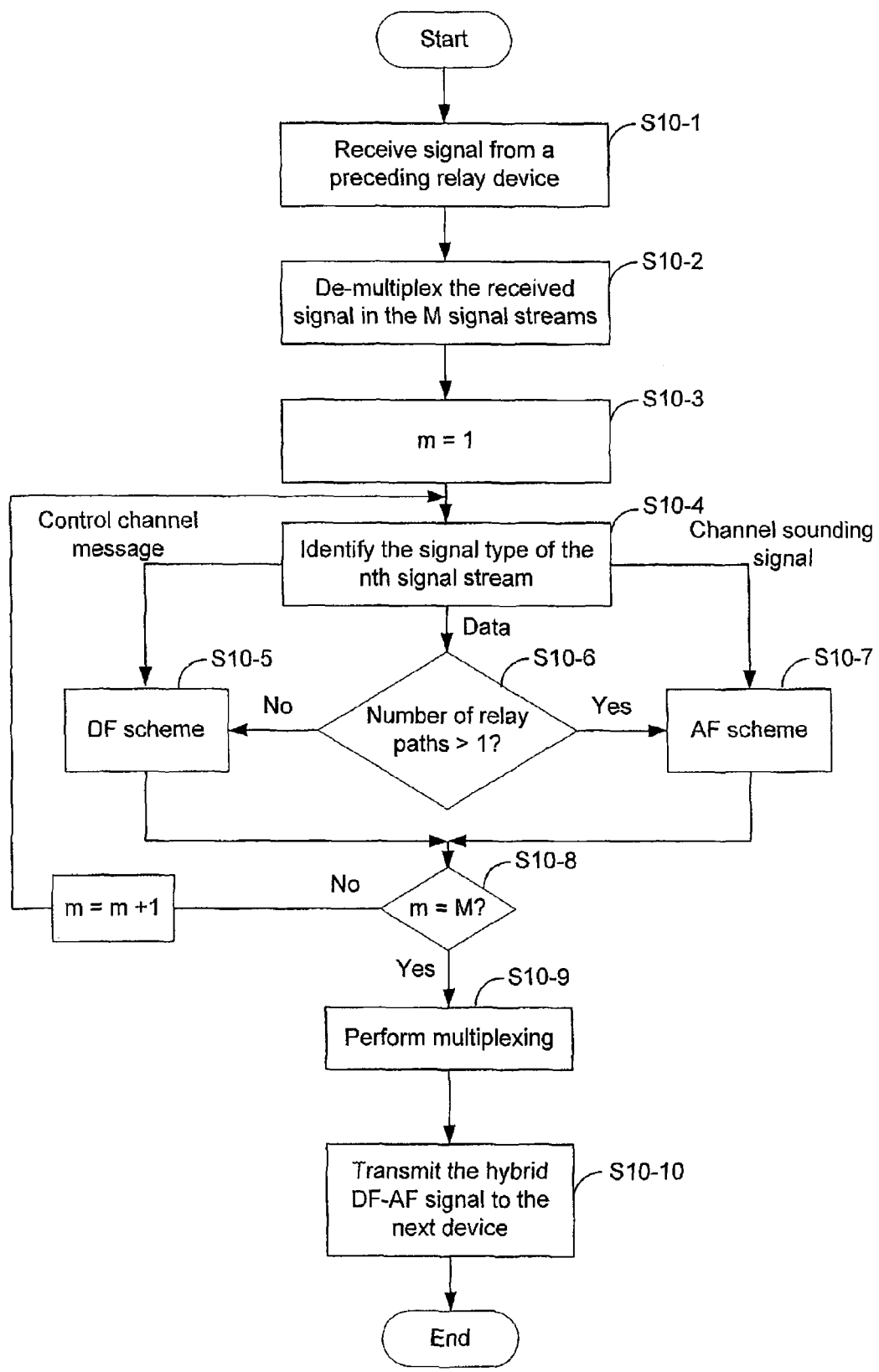
FIG. 13 illustrates the steps of selecting a relay scheme according to another embodiment.

FIG. 13 illustrates the steps of relaying a hybrid DF-AF signal using multiplexing according to the above embodiment.

Step S10-1: the method commences when a signal is received by a relay node at the $n^{th}$ phase.

Step S10-2: De-multiplex the received signal into M signal streams. As noted above, the de-multiplexing operation can be performed using TDM, FDM, CDM, SDM, or a combination of different de-multiplexing technique.

Step S10-3: Initialise the number of signal streams, m=1.

Step S10-4: Identify the signal type of $m^{th}$ signal stream.

If the identified signal type is a control channel message, the DF scheme will be selected (step S10-5).

If the identified signal type is a data signal, the number of relay paths will be determined in step S10-6. If there is only one relay path, the DF scheme will be selected (step 10-5). Otherwise, the AF relay scheme will be used (step 10-7).

If the identified signal type is a channel sounding signal, the AF scheme will be selected (step 10-7).

Step 10-8: Check whether all the signal streams have been processed. If yes, perform multiplexing of the processed signal streams in step S10-9. Otherwise, repeat steps S10-4 to S10-8.

Step 10-10: Transmit the multiplexed hybrid DF-AF signal to the next node.

This embodiment allows wide range communication systems, such as TDMA (Time Division Multiple Access), FDMA (Frequency Division Multiple Access), CDMA (code Division Multiple Access), and SDMA (Space Division Multiple Access) to be adapted in a hybrid DF-AF relay configuration.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

The invention claimed is:

1. A method of relaying a signal in a wireless communications network comprising a plurality of wireless devices, the method being performed by at least one of said wireless devices to relay a signal in a communication path between one of said plurality of wireless devices and another one of said wireless devices, wherein said at least one of said wireless devices comprises a power amplifier for amplifying said signal, the method comprising:
receiving a signal from said one of said plurality of wireless devices;
determining, for each one of a plurality of predetermined relay modes, a respective peak-to-average power ratio that a reference signal is expected to exhibit in the event that the respective predetermined relay mode is used for relaying the reference signal;
determining a back-off value associated with said power amplifier;
selecting a mode of relaying said received signal from said plurality of predetermined relay modes based on said determined peak-to-average power ratios and said determined back-off value; and
transmitting said signal to said another one of said plurality of wireless devices using said selected mode.

2. The method according to claim 1, wherein said selecting mode of relaying said signal is performed such that the peak-to-average power ratio of said reference signal is less than or equal to the back-off value.

3. The method according to claim 1, wherein said plurality of predetermined relay modes includes a decode-and-forward mode, a fixed gain amplify-and-forward mode, and a variable gain amplify-and-forward mode.

4. A relay device for relaying a signal in a wireless communications network comprising a plurality of wireless devices, the relay device being configured to relay said signal in a communication path between one of said plurality of wireless devices and another one of said plurality of wireless devices, the relay device comprising:
a receiver for receiving a signal from one of said plurality of wireless devices;
a power amplifier for amplifying said received signal;
a processor configured to determine, for each one of a plurality of predetermined relay modes, a respective peak-to-average power ratio that a reference signal is expected to exhibit in the event that the respective predetermined relay mode is used for relaying the reference signal, and to determine a back-off value associated with said power amplifier;
a selector for selecting a mode of relaying said received signal from said plurality of predetermined relay modes based on said determined peak-to-average power ratios and said determined back-off value; and
a transmitter for transmitting said received signal to said another one of said plurality of wireless devices using said selected mode.

5. The relay device according to claim 4, wherein said selector is configured to select a mode of relaying said received signal such that the peak-to-average power ratio of the received signal is less than or equal to the back-off value.

6. The relay device according to claim 4, wherein said plurality of predetermined relay modes includes a decode-and-forward mode, a fixed gain amplify-and-forward mode, and a variable gain amplify-and-forward mode.

7. A non-transitory computer readable storage medium comprising computer executable instructions which, when executed by a computer in a wireless device, are operable to cause said computer to:
receive a signal from another wireless device;
determine a respective peak-to-average power ratio of a reference signal for each one of a plurality of predetermined relay modes;
determine a back-off value associated with a power amplifier associated with one of the wireless devices;
select a mode of relaying said received signal from said plurality of predetermined relay modes based on said determined peak-to-average power ratios and said determined back-off value; and
transmit said signal to said another wireless device using said selected mode.

* * * * *